United States Patent [19]

Morita

[11] Patent Number: 4,658,789

[45] Date of Patent: Apr. 21, 1987

[54] IGNITION TIMING CONTROL SYSTEM AND METHOD FOR AN INTERNAL COMBUSTION ENGINE

[75] Inventor: Tatsuo Morita, Yokosuka, Japan

[73] Assignee: Nissan Motor Company, Limited, Yokohama, Japan

[21] Appl. No.: 809,733

[22] Filed: Dec. 17, 1985

[30] Foreign Application Priority Data

Jan. 31, 1985 [JP] Japan .................................. 60-18058
Jan. 31, 1985 [JP] Japan .................................. 60-18059

[51] Int. Cl.$^4$ ............................................. F02P 5/145
[52] U.S. Cl. .................................... 123/422; 123/425
[58] Field of Search ............... 123/415, 416, 417, 422, 123/423, 425

[56] References Cited

U.S. PATENT DOCUMENTS

| | | | |
|---|---|---|---|
| 4,428,343 | 1/1984 | Schweikert et al. | 123/425 |
| 4,448,163 | 5/1984 | Yoshida | 123/422 |
| 4,508,079 | 4/1985 | Komurasaki et al. | 123/422 |
| 4,513,716 | 4/1985 | Haraguchi et al. | 123/422 |

FOREIGN PATENT DOCUMENTS

| | | | |
|---|---|---|---|
| 3309947 | 7/1984 | Fed. Rep. of Germany | 123/422 |
| 58-217775 | 12/1983 | Japan | 123/425 |
| 59-168266 | 9/1984 | Japan | 123/422 |

OTHER PUBLICATIONS

"VG-Series Engine Service Manual 1983" Jun. 1983, by Nissan Motor Company, Limited.

Primary Examiner—Andrew M. Dolinar
Attorney, Agent, or Firm—Schwartz, Jeffery, Schwaab, Mack, Blumenthal & Evans

[57] ABSTRACT

A system and method for controlling the ignition timing of an internal combustion engine, in which a predetermined transient state which increase the probability of engine knocking is detected, a basic ignition advance angle value determined by an engine operating condition is corrected by a retardation angle value which is stored when knocking is suppressed during the predetermined transient state and is returned quickly toward the basic advance angle while ensuring that engine knocking will not recur after the predetermined transient state is over.

13 Claims, 18 Drawing Figures

FIG.4 (a)
FUEL / INTAKE AIR

INTAKE AIR AMOUNT

FUEL AMOUNT

FIG.4 (b)
AIR-FUEL MIXTURE RATIO

LEAN ↑

↓ RICH t2

FIG.4 (c)
KNOCKING INTENSITY

REFERENCE VALUE Vo

FIG.4 (d)
RETARD ANGLE CORRECTION

SAk ↓

Tn

ΔSAr

ΔSAa t1 t3

→ TIME

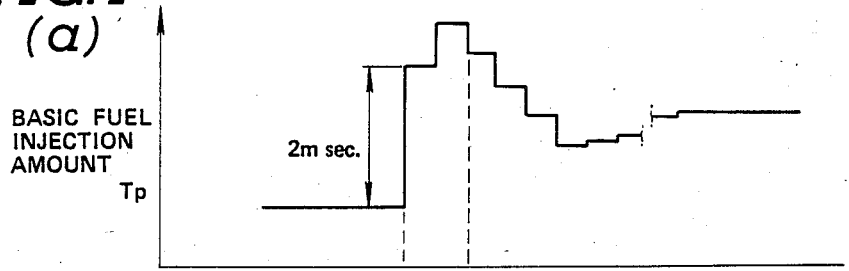
FIG. 7 (a) BASIC FUEL INJECTION AMOUNT Tp
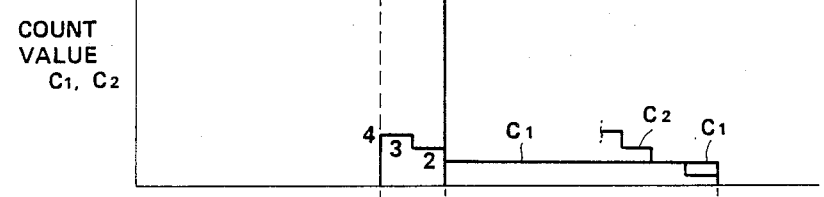
FIG. 7 (b) COUNT VALUE C1, C2
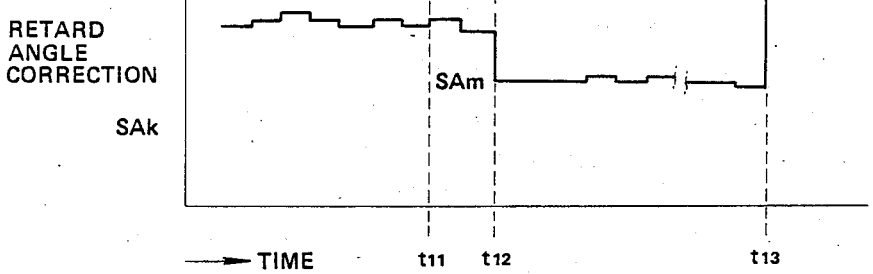
FIG. 7 (c) RETARD ANGLE CORRECTION SAk BASIC FUEL INJECTION AMOUNT Tp 2m sec.

COUNT VALUE $C_1$, $C_2$

RETARD ANGLE CORRECTION SAk

ABRUPT ADVANCE ANGLE CORRECTION $\Delta SA_{a2}$

WHEN KNOCKING IS PRESENT

TIME   $t_{11}$  $t_{12}$     $t_{13}$   $t_{14}$

IGNITION TIMING CONTROL SYSTEM AND METHOD FOR AN INTERNAL COMBUSTION ENGINE

BACKGROUND OF THE INVENTION

1. Field of the Invention

The present invention relates generally to an ignition timing control system for a vehicular internal combustion engine which prevents the occurrence of engine knocking.

2. Description of the Prior Art

It is desirable to prevent occurrence of engine knocking which is due mainly to accelerated violent burning of uncombusted gas since knocking brings about energy losses (reduction of engine output) and applies shocks to all parts of the engine and furthermore increases fuel consumption.

A conventional system for controlling ignition timing so as to suppress knocking is exemplified by "VG-series Engine Service Manual 1983" published by Nissan Motor Co., Ltd. on June 1983.

FIGS. 1 through 4 show the construction and action of the conventional ignition timing control system disclosed in the above-identified Japanese document.

In FIG. 1, 1 denotes an engine. Intake air is supplied to each engine cylinder via an intake air pipe 3 from an air cleaner 2 while fuel is supplied thereto via a fuel injector 4 according to an injection signal Si. Each cylinder is provided with an ignition plug 5 which receives a high-voltage pulse Pi from an ignition coil 7 via a distributor 6 at every ignition timing. The ignition coil 7, the distributor 6, and a plurality of ignition plugs 6 constitute ignition means 8 for igniting and burning the air-fuel mixture supplied to the engine. The ignition means 8 generates and discharges the high-voltage pulse Pi in accordance with an ignition signal Sp. In addition, the air-fuel mixture within each engine cylinder is ignited and exploded in response to discharge of the pulse Pi and the resulting exhaust gases are exhausted to atmosphere via an exhaust pipe 9.

In addition, the rate of flow Qa of intake air is detected by means of an air flow meter 10 and controlled by means of a throttle valve 11 installed within the intake air pipe 3. Vibrations Ve in the engine body 1 are detected by a knock sensor 12. An output signal from the knock sensor 12 is inputted to the knock vibration detector 13. The knock vibration detector 13 comprises a BPF (Band Pass Filter) which enables the passage of only a frequency range corresponding to vibrations due to knocking and an integrator which generates a voltage Vn (Vn=0 through 5 V) proportional to the intensity or amplitude of knocking vibrations generated per combustion stroke and outputs this voltage to a knock discriminator 14. The knock discriminator 14 compares the output voltage Vn of the knock vibration detector 13 to a determinating reference value Vo. If Vn>Vo, the knock discriminator 14 outputs a knock determination signal Sn having a high logic level "H". If Vn≦Vo, the knock determination signal Sn turns to the lower level "L". In addition, the engine revolutional speed N of the engine 1 is monitored by a crank angle sensor 15 built into the distributor 6. The electrical signals from the air flow meter 10, the knock discriminator 14, and the crank angle sensor 15 are inputted to a control unit 16. The control unit 16 carries out the ignition timing control on the basis of the information from the sensors described above (although the control unit 16 also controls the fuel injection amount injected by the fuel injector 4, the detailed description thereof is omitted).

FIG. 2 is a block diagram of the major functional element of the ignition timing control system. The control unit 16 comprises functionally a correction amount calculator 21, a corrector 22, an ignition signal generator 23, an ignition timing calculator 24, and a Tp calculator 25. The Tp calculator 25 receives signals from the air flow meter 10 and crank angle sensor 15 and derives the basic fuel injection amount Tp. The basic fuel injection amount Tp in units of milliseconds (since the fuel injector 4 opens to inject fuel at a fixed rate for an opening duration determined by a pulse duration) is derived from the following equation (1) and the results of this calculation are outputted to the ignition timing calculator 24:

$$Tp = K \times Qa/N \tag{1}$$

where K is a constant

The ignition timing calculator 24 receives the signal from the crank angle sensor 15. The ignition timing calculator 24 looks up a basic advance angle value SAo from a three-dimensional table map using known table look-up techniques and outputs the basic advance angle SAo to the corrector 22. Since the basic advance angle value SAo corresponds to an optimum ignition timing according to engine operating conditions, it is represented by a crank angle value before top dead center in the compression stroke of a specific engine cylinder. The corrector 22 furthermore receives a retard angle correction value SAk from the correction amount calculator 21. The correction amount calculator 21 calculates the retard angle correction value SAk (SAk ≦0) to correct the basic advance angle value SAo toward the retardation side depending on the presence or absence of knocking. The initial value of the retard angle correction value SAk is set to 0° and when the knocking discrimination signal Sn is at its high ("H") level, the value SAk is calculated from the following equation (2) for each ignition timing:

$$SAk = SAk' - \Delta SAr, \tag{2}$$

where SAk' denotes the retard angle correction amount from the previous ignition timing, SAk a retard angle correction amount for the present ignition timing, and ΔSAr a correction value toward the retardation side per ignition cycle.

On the other hand, when the signal Sn is at a low ("L") level (no knocking), the value SAk is updated in the following equation (3):

$$SAk = SAk' + \Delta SAa, \tag{3}$$

where ΔSAa denotes a correction value toward the advance side per ignition cycle. The upper limit of SAk when updating toward the advance side is zero degrees (0°) and will never be a positive value exceeding zero degrees. The corrector 22 corrects the basic advance angle value SAo with the retardation angle correction value SAk and calculates a final advance angle value SA expressed in the following equation (4):

$$SA = SAo + SAk \tag{4}$$

The ignition signal generator 23 outputs the ignition signal Sp to the ignition means 8 at a timing corresponding to the final advance angle SA. The high-voltage pulse Pi is generated at the same timing to ignite the air-fuel mixture.

Hence, if knocking is detected, the ignition timing is repeatedly retarded in small increments to suppress knocking and thereafter, once the knocking stops, the ignition timing is again slowly advanced to hold the optimum combustion state. In this case, the correction value ΔSAr is set approximately to 1° and the value of ΔSAa is approximately set as follows: ΔSAa=Δ-SAr×(1/10 to 1/15). The reason for this difference in value is that although knocking must be immediately suppressed, the return from the retardation angle to the normal advance angle is best carried out slowly so that the ignition timing angle does not quickly approach the knocking region again.

However, since the conventional ignition timing control system is so constructed that once knocking is actually detected, the ignition timing is retarded, it is inevitable that engine performance (e.g., of torque) is reduced at the initial stages of knocking. Furthermore, since the conventional system is so constructed that after the knocking is suppressed, the ignition timing is slowly returned to the advance side, the ignition timing may be retarded more than is necessary when knocking occurs, for example, due to a especially lean air-fuel mixture. Consequently, it is necessary to improve the conventional ignition timing control system in order to enhance engine driving performance.

In more detail, when acceleration is ordered via an accelerator pedal at a time $t_1$ as shown in FIG. 4(a), the increase in the fuel supply lags slightly behind the change in the supply amount of intake air, e.g. the increase in the fuel supply starts at a time $t_2$ following the time $t_1$. This delay introduces a temporary leanness to the air-fuel mixture ratio (the air-fuel mixture becomes leaner than the stoichiometric ratio) as shown in FIG. 4(b). Consequently, this causes relatively intense knocking as shown in FIG. 4(c). This is because the combustion speed is slower for such lean air-fuel mixtures and the exhaust temperature and thus the temperature at the exhaust valve(s) are increased, so that the engine cylinder is subjected to knocking. At this time, the ignition timing starts to be corrected in a series of steps of value ΔSAr toward the retardation side for each ignition timing starting at the ignition timing following time $t_1$ as shown in FIG. 4(d). The above-described correction process continues until the knocking is suppressed at time $t_3$ as shown in FIG. 4(c). Hence, the interval Tn between times $t_1$ and $t_3$ is the interval during which knocking occurs. After knocking intensity drops to an acceptable level at the time $t_3$, the ignition timing starts to be returned toward the advance side. The interval Tn is practically limited to within several engine revolutions after the accelerator pedal is depressed. That is to say, knocking due to acceleration occurs only within the interval Tn. For convenience, Tn is referred to as a knock induction time interval. It should be noted that although during the time interval Tn, knocking actually occurs in the conventional system as shown in FIG. 4(c), the knock induction time interval also refers to an interval during which there is a possibility of inducing knocking due to a lean air-fuel mixture immediately following the onset of acceleration.

Thus, even if engine knocking is suppressed within the knock induction time interval Tn, the influence of knocking cannot be eliminated completely and engine performance is degraded at the initial stage of acceleration.

In addition, since the process of returning ignition timing toward the advance side upon completion of the knock induction time interval Tn is carried out only with small increments ΔSAa, a prolonged reduction of torque injurious to the output performance of the engine 1 cannot be prevented. Therefore, the correction of the ignition advance angle needs to be carried out with an improvement in output performance in mind.

SUMMARY OF THE INVENTION

With the above-described problem in mind, it is an object of the present invention to provide an ignition timing control system which achieves an improvement in engine performance during and/or immediately after the above-described knocking induction time interval.

This can be achieved by a system for controlling an ignition timing of an internal combustion engine comprising (a) first means for detecting engine operating conditions, (b) second means for determining a basic ignition advance angle on the basis of the detected engine operating conditions, (c) third means for determining on the basis of the detected engine operating conditions whether the engine is starting to operate in a predetermined transient state having a causal relation to the occurrence of knocking, (d) fourth means for correcting the basic timing advance angle by a retardation angle so that no knocking will occur during the predetermined transient state when the third means determines that the engine is starting to operate in the predetermined transient state, and (e) fifth means for igniting air-fuel mixture supplied to the engine at a timing corresponding to the corrected ignition timing angle.

BRIEF DESCRIPTION OF THE DRAWINGS

A more complete understanding of the present invention may be obtained from the following description taken in conjunction with the attached drawings in which like reference numerals designate corresponding elements and in which:

FIG. 4(a) through FIG. 4(d) are timing charts for explaining the action of the conventional ignition control system shown in FIGS. 1 and 2;

FIGS. 7(a) through 7(c) are timing charts for explaining the action of the second preferred embodiment;

DETAILED DESCRIPTION OF THE PREFERRED EMBODIMENTS

Reference will be made to the drawings in order to facilitate understanding of the present invention.

Figure 5:
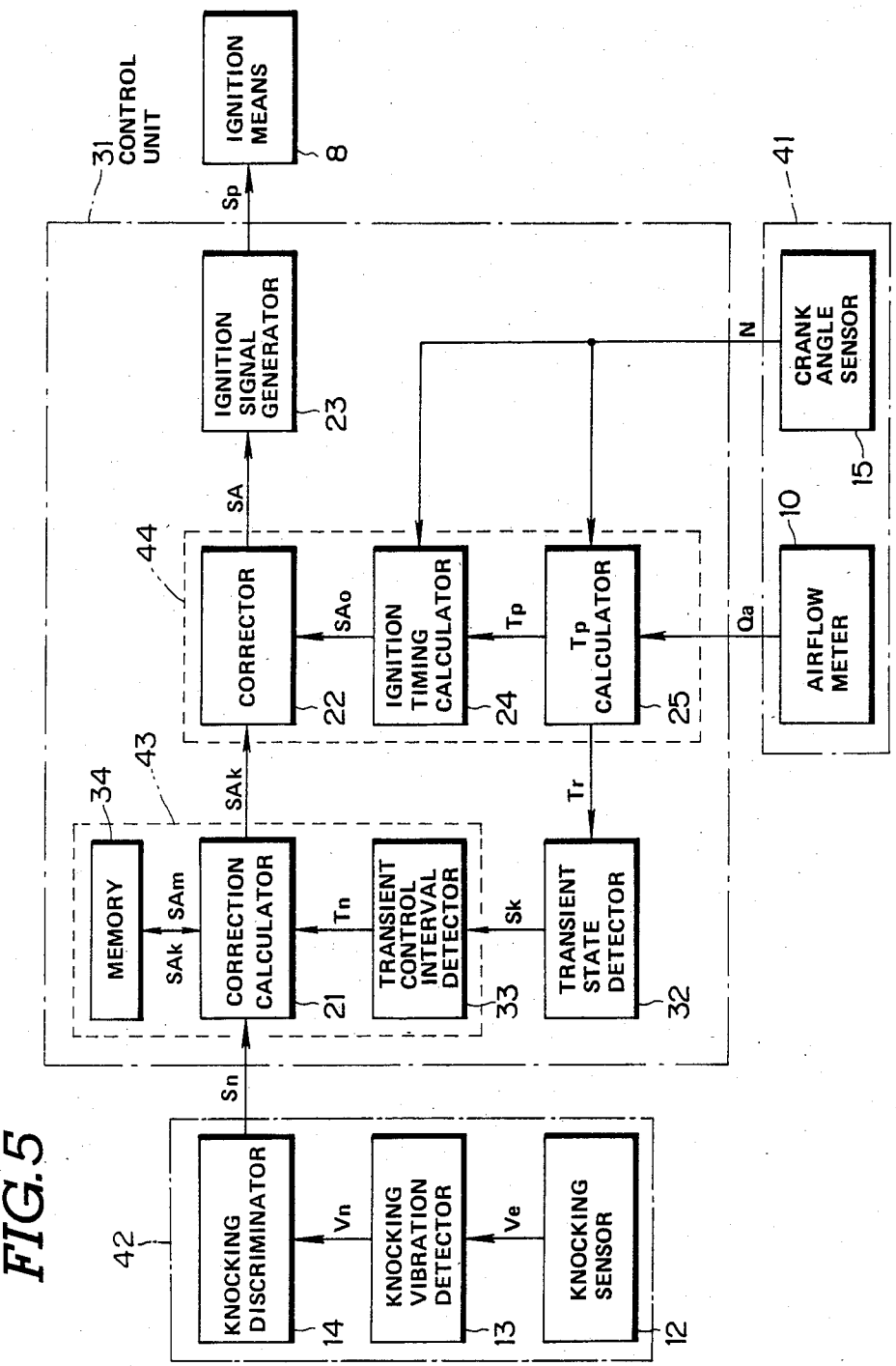
FIG. 5 is a functional block diagram of an ignition timing control system in a first preferred embodiment according to the present invention.

First, FIG. 5 shows a first preferred embodiment of the present invention.

Figure 2:
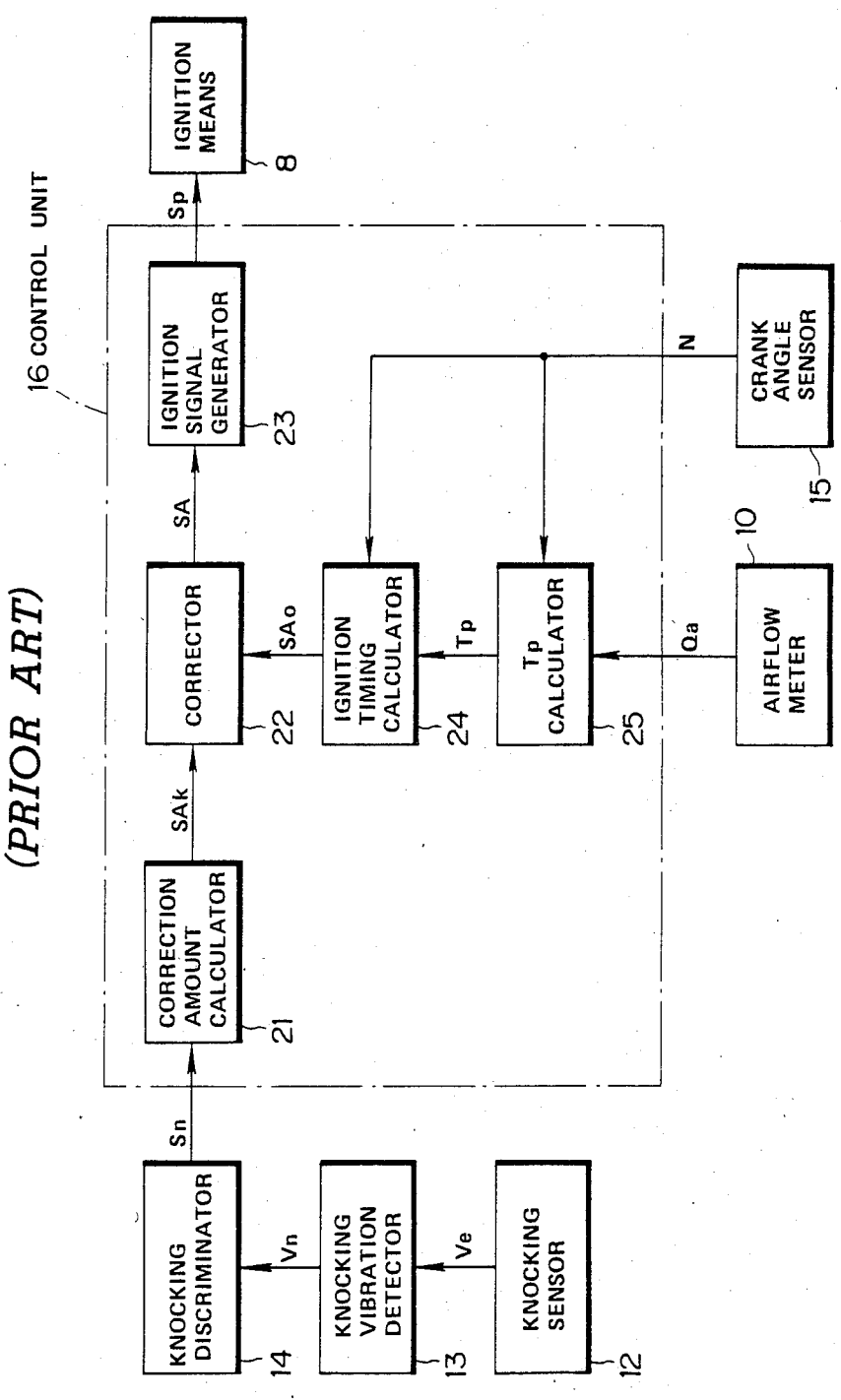
FIG. 2 is a functional block diagram of the ignition timing control system shown in FIG. 1.
Figure 3:
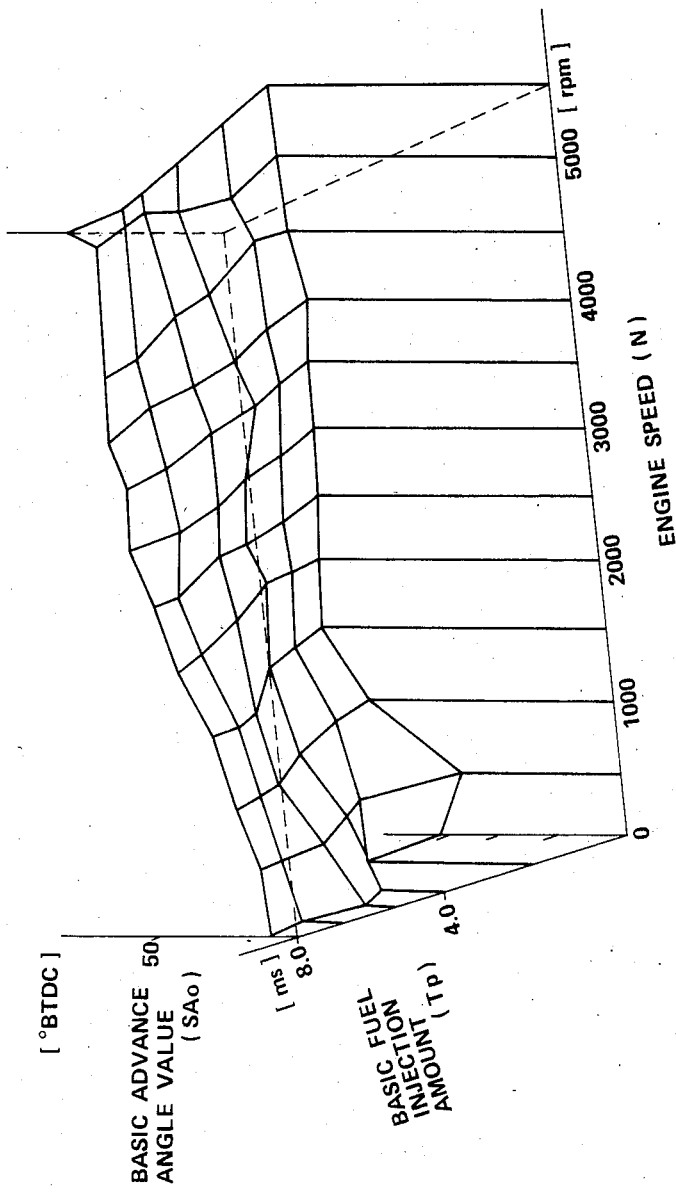
FIG. 3 is a graph of advance angle (in units of °BTDC) with respect to an engine speed (N) (in units of RPM) and basic fuel injection amount (Tp) (in units of msec.)

In FIG. 5, a control unit 1 comprises functionally a transient detector 32, a transient control interval detector 33, and a memory 34 in addition to the conventional elements shown in FIG. 2. The transient detector 32 calculates the rate of change of engine load ΔTp (rate of change Tp per ignition cycle (IGN) or per unit time) from the output of the Tp calculator 25. If at first ΔTp>2 msec/IGN and thereafter ΔTp drops to a negative value within a predetermined number of engine revolutions (e.g., 2 revolutions), a high-level transient determination signal Sk is outputted to the transient control interval detector 33. In other cases (non-transient or stable states), the signal Sk is at a low level (L). In other words, when a predetermined initial acceleration state is detected, the signal Sk goes high. When no predetermined initial acceleration state is detected, the signal Sk goes low. It should be noted that detection of the initial acceleration state may be based on changes in the opening angle of the engine throttle valve or changes in the intake manifold negative pressure in place of the changes in Tp described above.

The transient control interval detector 33 detects the knock induction time interval Tn caused by a temporarily lean air-fuel mixture ratio during the acceleration period. The transient control interval detector 33 marks an interval of time starting from when the transient determination signal Sk first goes high and lasting for a predetermined number of engine revolutions (e.g., ten revolutions) (the knock induction time interval Tn) and outputs a signal during this period to the correction amount calculator 21.

The correction calculator 21 serves to send a retard angle correction value SAk to a memory 34 after knocking has been suppressed in addition to the functions it performed in the conventional ignition timing control system. The memory 34 thus "learns" the updated value of SAk corresponding to the instantaneous engine operating conditions and stores it into a corresponding memory area as a correction memory value SAm. It should be noted that the memory 34 is non-volatile and therefore holds the values SAm after the engine 1 stops.

Furthermore, the correction calculator 21 immediately reads the stored correction amount value SAm from a memory area of the memory 34 corresponding to the current engine operating state in response to the knock induction time interval signal Tn without waiting for the change in the knock determination signal Sn to the high (H) level. The correction calculator 21 outputs the stored value SAm to the corrector 22 as a retard angle correction SAk. In addition, during the knock induction time interval Tn the value of SAk is updated in accordance with the knock determination signal Sn from the knock discriminator 14 as shown in equations (2) and (3). Upon expiration of the knock induction time interval Tn, the ignition timing value SA is immediately returned to the basic advance angle value SAo with a predetermined return angle (in this embodiment, the absolute value thereof equals that of SAk immediately before the knock induction time interval Tn is ended but with the sign reversed). That is to say, the value of SAk is updated to zero (SAk=0°) immediately after the end of the knock induction time interval Tn. Furthermore, immediately before the knock induction time interval Tn expires, the retard angle correction value SAk is stored in the memory 34 as the correction value SAm.

It is noted that in FIG. 5, numeral 41 denotes means for detecting engine operating conditions comprising an airflow meter 10 and a crank angle sensor 15. Numeral 42 denotes means for detecting engine knocking which comprises a knocking sensor 12, a knocking vibration detector 13, and a knocking discriminator 14. It is also noted that the transient state detector 32 serves as means for detecting transient states such as brief acceleration. Numeral 43 denotes means for calculating the correction value which comprises the correction calculator 21 and transient control interval detector 33. The memory 34 serves as data storing means. Numeral 44 denotes means for setting an advance angle which comprises the corrector 22, the ignition timing calculator 24, and the Tp calculator 25. The ignition signal generator 23 serves as means for generating the ignition signal Sp.

The operation of the ignition timing control system shown in FIG. 5 will be described below.

In general, proper ignition timing control can prevent or at least quickly suppress knocking. In one such ignition timing control method, the ignition timing angle is advanced in the absence of knocking. When knocking occurs, however, the ignition timing is retarded. Consequently, the combustion state is so controlled as to provide an optimum state of combustion with a low probability of engine knocking. However, since it is a prerequisite to detect the occurrence of knocking in such an ignition timing control system, it is very difficult to eliminate the ill effects of knocking at the initial stage of knock suppression.

However, if occurrences of knocking can be predicted, knocking can be prevented even from the initial stages. The knock induction time interval Tn, in this embodiment, is accurately predicted by detecting situations in which knocking may occur transiently. In addition, the retard angle correction value SAk obtaining immediately before the end of the knock induction interval of time Tn is stored for later reference, i.e. "learned", and the learned value is used as the subsequent retard angle correction amount SAk to prevent knocking before it actually occurs, thus fully eliminating the ill effects of knocking.

Another consideration is that when the ignition timing angle is adjusted to a region in which the frequency of occurrence of knocking is extremely rare as part of the knock suppression process, engine output performance is sacrificed if the return to the normal ignition timing angle is slow. Therefore, in this embodiment, since the knock induction time interval Tn is detected on the basis of engine operating conditions and the frequency of occurrence of knocking will always be extremely low upon expiration of the interval Tn, engine output performance is improved by returning the ignition timing to the basic advance angle immediately after the end of the knock induction time interval Tn.

That is to say, during acceleration, the transient state detector 32 detects the initial state of acceleration when the accelerator pedal is depressed and turns the transient state determination signal Sk to the high (H) level. Therefore, the means for calculating the correction value 43, made up of the transient control interval detector 33 and the correction calculator 21, determines that the engine has entered a knock induction time interval Tn and so reads the initial correction value SAm from the memory 34, adopting it as the initial retard angle correction value SAk. The basic advance angle value SAo is immediately corrected in accordance with the above-described equation (4) so as to start retarding the ignition timing. Hence, actually, the ignition timing is retarded immediately following the onset of acceleration so that no knocking will occur during the knock induction time interval Tn. This means that knocking can be prevented even when the engine is most susceptible (the knock induction time interval Tn) which contrasts noticeably with conventional ignition timing control methods, and thus engine performance can be improved remarkably without the ill effects of knocking. Since, in this embodiment, the ignition timing is immediately updated to SAk=0° to return the ignition timing angle to the optimum advance angle upon expiration of the knock induction interval Tn, the reduction of engine output can be minimized.

It should be noted that although in this embodiment the correction of the advance angle is carried out immediately by setting the value SAk to 0° (SAk=0°), the ignition timing angle value may be updated incrementally toward the advance angle side by a predetermined value per ignition cycle (for example, in increments of 1° or greater).

Figure 6A:
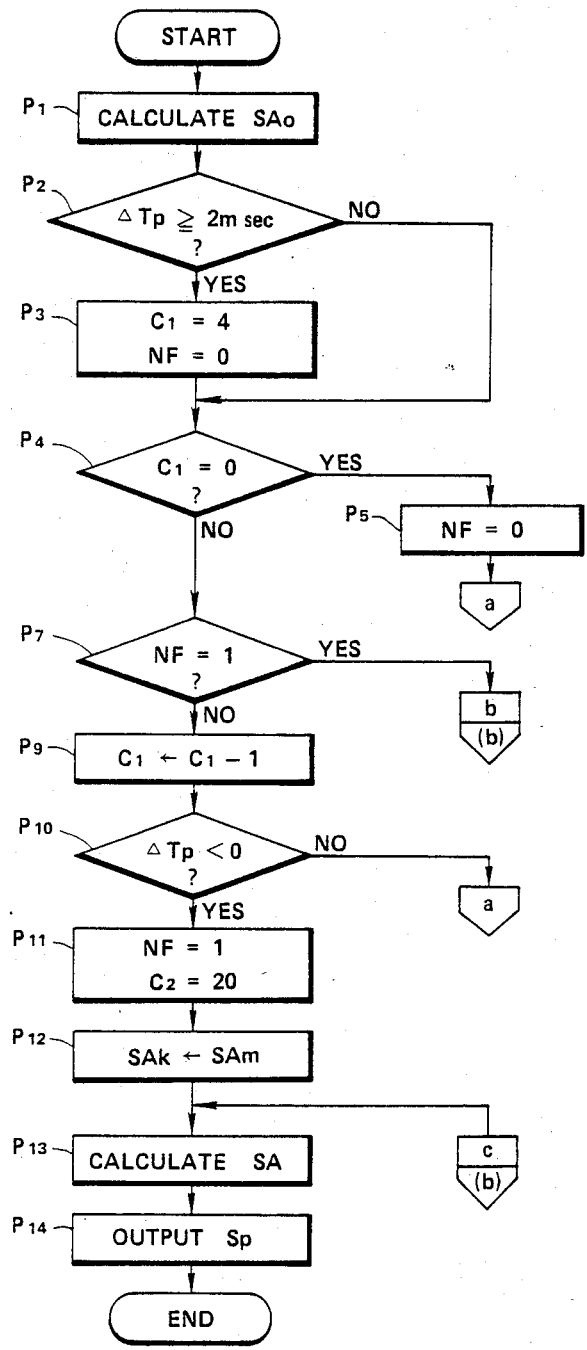
FIG. 6(a) and FIG. 6(b) are integrally a program flowchart for the ignition timing control system in a second preferred embodiment.

FIGS. 6(a) and 6(b) show a second preferred embodiment in which a microcomputer using a given program is applied to the present invention.

Figure 1:
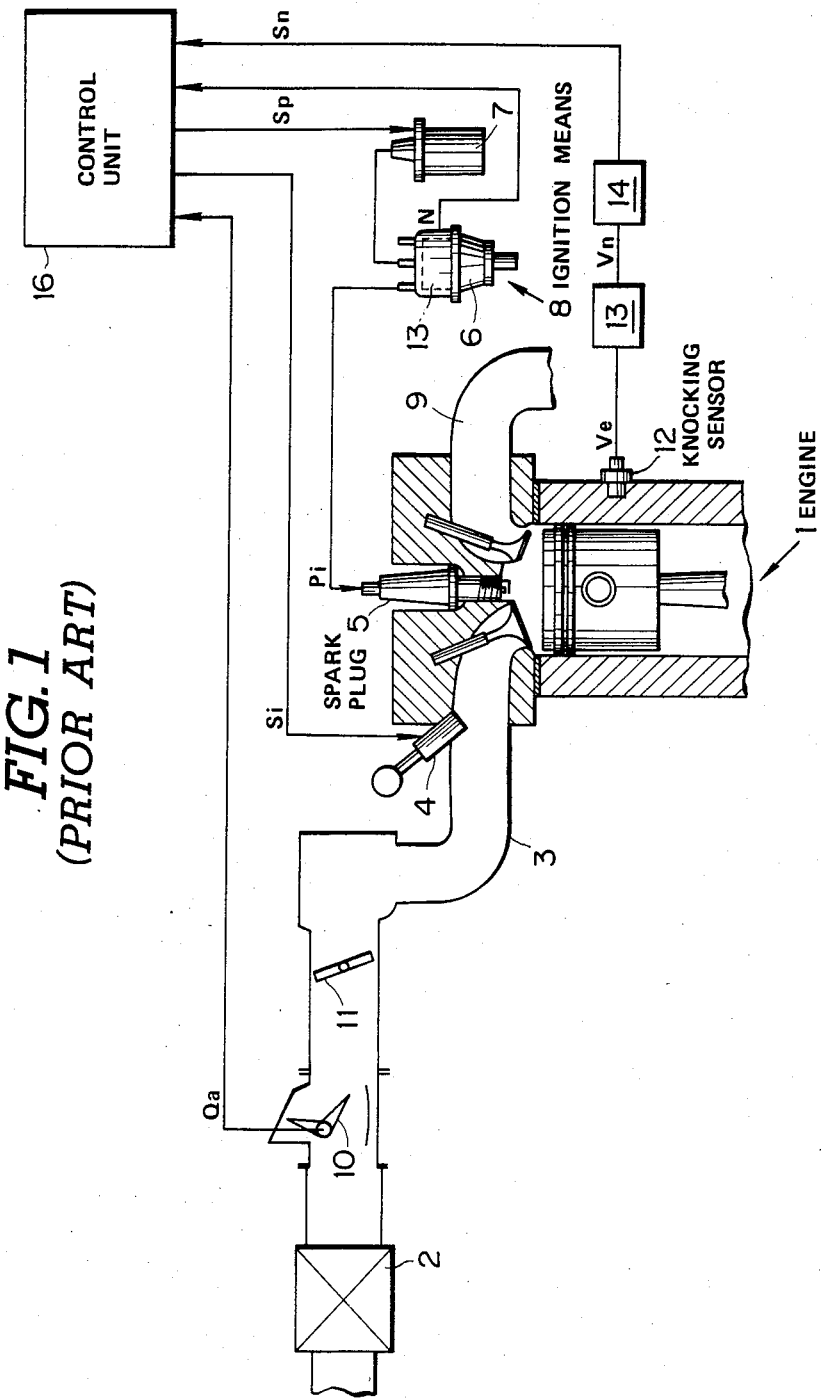
FIG. 1 is a schematic drawing of an entire conventional ignition timing control system.

It should be noted that the hardware is substantially the same as shown in FIG. 1 except that the control unit 16 is embodied by the microcomputer. The microcomputer comprises a Central Processing Unit (CPU), a Random-Access Memory (RAM), a Read-Only Memory (ROM), and an Input/output Port (I/O).

In this embodiment, the control unit, i.e., microcomputer, functionally comprises means for detecting the transient state, means for setting the advance angle value of ignition timing, means for calculating the correction value, storing means, and ignition signal generating means, the data used for various calculations being held after the engine 1 stops.

FIGS. 6(a) and 6(b) together form a program flowchart by which the control unit (microcomputer) executes the ignition timing control in each ignition cycle.

First, in a step $P_1$, the control unit calculates the basic advance angle value SAo in accordance with the operating conditions of the engine 1. This calculation is, e.g., carried out by looking up a corresponding optimum value in a table map plotted versus N and Tp as shown in FIG. 2 and as described with regard to the first preferred embodiment. Next, in a step $P_2$, the control unit determines whether the rate of change $\Delta Tp$ of the basic fuel injection amount Tp per ignition cycle (IGN) is equal to or more than 2 msec./IGN. If $\Delta Tp \geq 2$ msec./IGN, the control unit recognizes that the engine is operating in a transient state and the control unit sets a count value $C_1$ of a first counter to 4 ($C_1=4$) in a step $P_3$. Thereafter, the control unit resets a knock zone flag NF (NF=0) and the routine advances to a step $P_4$. On the other hand, if $\Delta Tp<2$ msec./IGN, the routine goes directly to the step $P_4$. The first counter is used in conjunction with a second counter to be described later to recognize the knock induction time interval Tn, and its set value $C_1=4$ represents two revolutions of the engine. In addition, the knock zone flag NF indicates whether or not there is currently a knock induction time interval Tn. When set (NF=1), the flag NF means that we are in a knock induction interval Tn and when reset (NF=0), it means that there is no current interval Tn.

The control unit then checks the value $C_1$ of the first counter in a step $P_4$. If $C_1=0$ (when the first counter is cleared), the control unit resets the knock zone flag NF and continues to the step $P_6$. If $C_1 \neq 0$, the routine goes to the step $P_7$ in which it checks the knock zone flag NF. If NF=1, the routine goes to a step $P_8$. If NF=0, the routine goes to a step $P_9$, wherein the control unit decrements the count value $C_1$ of the first counter by one, and then to a step $P_{10}$. In the step $P_{10}$, the control unit determines whether or not the rate of change $\Delta Tp$ is negative. If $\Delta Tp<0$, the control unit recognizes that the engine has just entered (hereinafter referred to as a zone start timing) a predetermined transient state (i.e., knock induction time interval Tn). Thereafter, the control unit executes a retard angle processing routines at steps $P_{11}$ through $P_{14}$. On the other hand, if $\Delta Tp \geq 0$ in the step $P_{10}$, the control unit recognizes that it is not the zone start timing and the routine goes to the step $P_6$.

During the zone start timing, the knock zone flag NF is set (NF=1) and the count value $C_2$ of the second counter is set to 20 ($C_2=20$) in the step $P_{11}$. In the step $P_{12}$, the stored correction value SAm is retrieved from memory for use as the initial retard angle correction SAk. In the step $P_{13}$, the ignition timing value SA is derived and the corresponding ignition signal Sp is generated and output in the final step $P_{14}$.

Hence, the ignition timing is immediately retarded by the value SAm so that the knocking can immediately be prevented even at the very start of the knock induction interval Tn.

On the other hand, in cases where the routine branches from the steps $P_5$ or $P_{10}$ to the step $P_6$, the control unit first checks for knocking zone flag NF. If NF=1, the routine goes to the step $P_8$, wherein the count value $C_2$ of the second counter is decremented by one, and then to a step $P_{15}$. If NF=0 in the step $P_6$, the control unit recognizes that it is not in a knock induction time interval Tn and the routine goes to a step $P_{16}$, following which the normal knock control based on the output state of the knocking detecting means is executed.

In the step $P_{15}$, the control unit determines whether or not the count value $C_2$ of the second counter is zero. If $C_2 \neq 0$, the control unit recognizes that the engine is still operating within the knock induction time interval Tn and control passes to the step $P_{16}$ at which the normal knocking control process starts. If $C_2=0$ in the step $P_{15}$, the control unit recognizes that the knock induction time interval Tn is over. In the subsequent step $P_{17}$, the control unit resets the knock zone flag NF (NF=0) and clears the first counter ($C_1=0$). In the next step $P_{18}$, the final retard angle correction value SAk is stored as the value SAm into the corresponding memory area. To correct the advance angle, the control unit updates the value SAk to zero (SAk=0) in order to return the ignition timing angle to the basic advance angle value (SA=SA$_0$) and thereafter goes to the step $P_{13}$.

In the normal knocking control process after the routine passes through the step $P_6$ or $P_{15}$, the control unit determines whether or not knocking has occurred. If the engine is currently knocking, the routine goes to a step $P_{19}$ wherein the ignition timing is retarded in accordance with the equation (2). If there is no knocking (No), the routine goes to a step $P_{20}$ wherein the ignition timing angle is advanced in accordance with the equation (3). Thereafter, the routine goes to the step $P_{13}$. It should be noted that the lower limit of the correction angle value is $-15°$ and the upper limit of the correction angle value is $0°$.

FIGS. 7(a) through 7(b) are timing charts for explaining the ignition timing control procedure based on the above-described program, the flowchart of which is shown in FIGS. 6(a) and 6(b).

When the acceleration pedal is depressed at a time $t_{11}$, the basic fuel injection amount Tp is increased so that $\Delta$Tp becomes equal to or greater than 2 msec./IGN, as shown in FIG. 7(a). Therefore, as shown in FIG. 7(b), the first counter is set to 4 ($C_1=4$) and decremented in each of the next few ignition cycles. Before the count value $C_1$ of the first counter reaches zero, however, i.e., before the engine 1 has completed two revolutions, the value $\Delta$Tp changes to a negative value and the control unit recognizes that the engine is starting to operate in a knock induction time interval Tn and sets the count value $C_2$ of the second counter to 20, representing an interval Tn of 10 engine revolutions.

Thereafter, the value $C_2$ of the second counter is decremented in each ignition cycle. Hence, time $t_{12}$ in FIGS. 7 represents the zone start timing. The stored value SAm is retrieved for use as the retard angle correction value SAk at the time $t_{12}$, as shown in FIG. 7(c), so that the ignition timing is retarded to a value by which knocking can immediately be prevented. Consequently, knocking can be prevented even at the zone start timing.

The interval during which the count value $C_2$ of the second counter drops decrementally from 20 to 0 is defined as the knock induction time interval Tn and specifically corresponds to 10 revolutions of the engine 1. Hereafter, the execution flow will normally progress through the normal knocking control processing, as only in extreme case will further retard angle correction be necessary since the ignition timing is sufficiently retarded at the zone start timing $t_{12}$.

When the count value of the second counter reaches zero ($C_2=0$) at time $t_{13}$, the control unit recognizes that the knock induction time interval Tn is over and stores the current value SAk into the corresponding memory area as the value SAm and immediately carries out the advance angle correction by updating SAk to $0°$.

Figure 8:
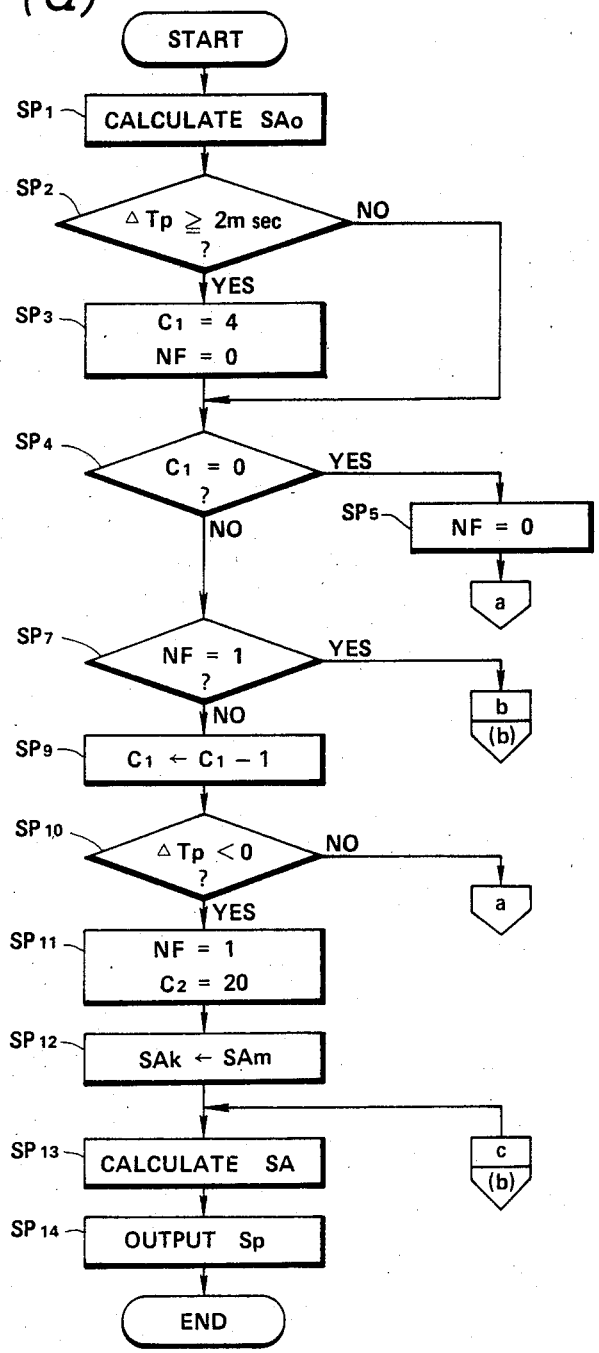
FIGS. 8(a) and 8(b) are integrally a program flowchart of the ignition timing control system in a third preferred embodiment.
Figure 8:
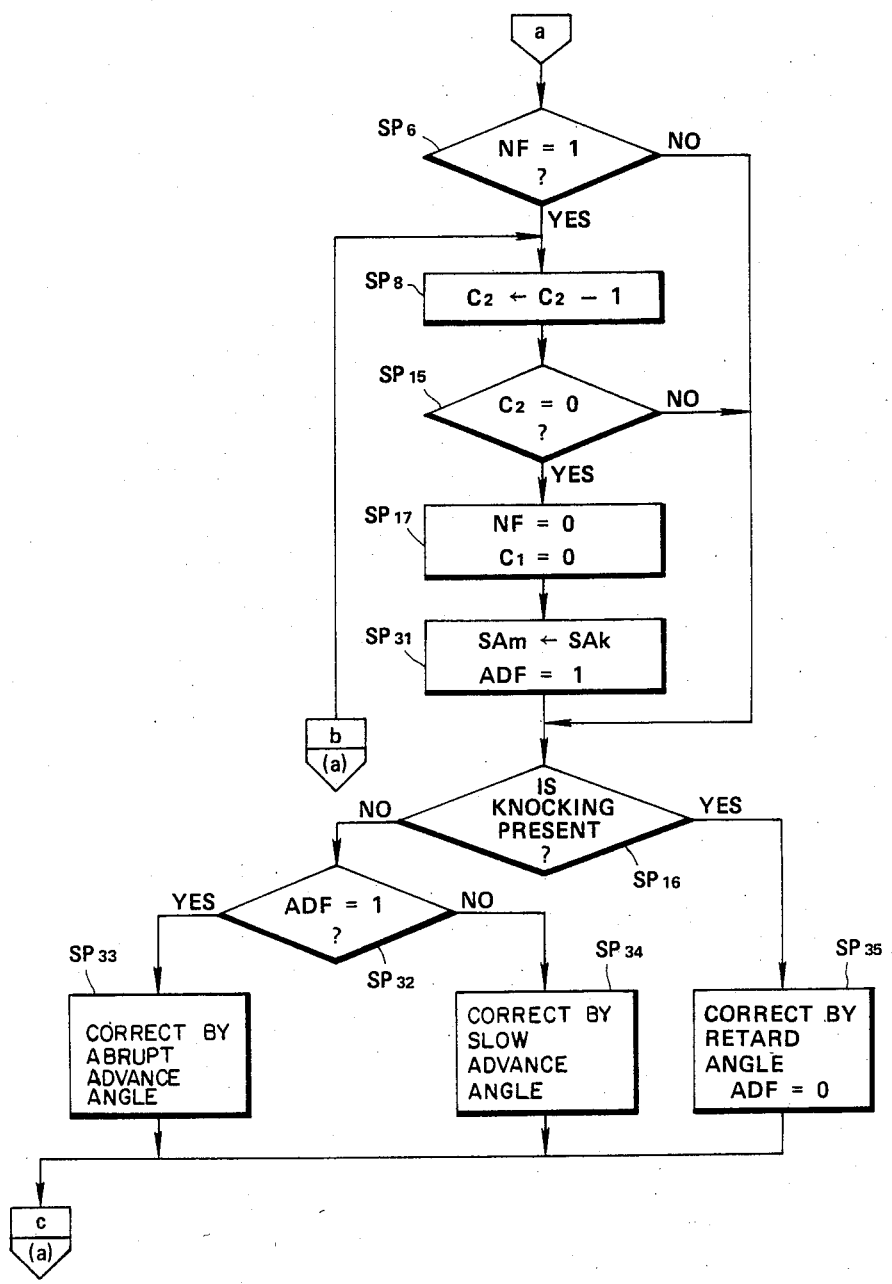

FIGS. 8(a) and 8(b) together form a program flowchart for the control unit in a third preferred embodiment, in which the advance angle correction is different from that in the second preferred embodiment.

Figure 6:
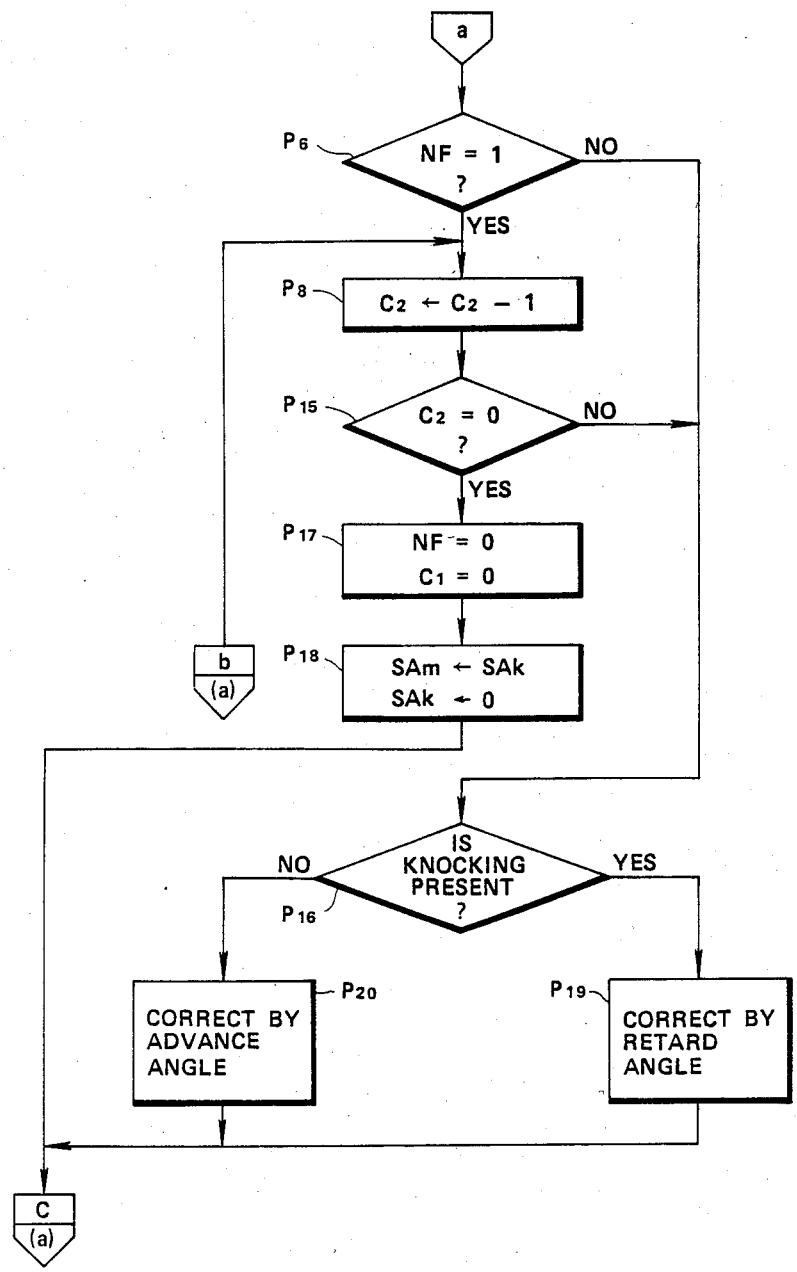

In FIGS. 8(a) and 8(b), the contents of steps $SP_1$ through $SP_{17}$ are the same as those steps $P_1$ through $P_{17}$ in FIGS. 6(a) and 6(b) of the second preferred embodiment. The steps $SP_{31}$ through $SP_{35}$ are different, from the steps $P_{16}$–$P_{20}$ of FIGS. 6. Therefore, only these different steps will be described below.

After $C_2=0$ so that the control unit recognizes that the knock induction time interval Tn has ended in the step $SP_{15}$, the routine goes via step $SP_{17}$ to the step $SP_{31}$ wherein the current value SAk is stored into the memory as SAm and an advance flag ADF is set (ADF=1). Then, the routine goes to the step $SP_{16}$.

The advance flag ADF indicates the magnitude of the required advance angle correction after the end of the knock induction time interval Tn. If ADF=0, the control unit uses a small value $\Delta$SAa1 for the advance angle correction value, and if ADF=1, the control unit uses a large value $\Delta$SAa2 therefor.

Next, the control unit determines whether knocking has occurred in the step $SP_{16}$. If no knocking occurs, the control unit checks the status of advance flag ADF in the step $SP_{32}$. If ADF=1, the routine goes to the step $SP_{33}$, in which the retard angle correction value SAk is updated in accordance with the following equation (5) (hereinafter, referred to as abrupt advance angle correction), and then to the step $SP_{13}$:

$$SAk = SAk' + \Delta SAa2 \qquad (5)$$

It should be noted that the advance angle correction value $\Delta$SAa2 is set as follows: $\Delta SAa1 < \Delta SAa2 \leq \Delta SAr$ ($\Delta$SAr is the correction value toward the retardation side shown in the equation (2)). In the advance angle processing in the step $SP_{33}$, the ignition timing angle is limited to a predetermined upper limit value (a predetermined value less than $0°$) and if the ignition timing angle reaches the predetermined limit value, the control unit resets the flag ADF (ADF=0). Hence, the ignition timing is corrected slowly thereafter. Conversely, if ADF=0 in the step $SP_{32}$, the routine goes to the step $SP_{34}$ in which the value SAk is updated in accordance with the equation (3) (hereinafter, referred to as slow advance angle correction) and the routine then advances to the step $SP_{13}$.

On the other hand, if knocking is detected in the step $SP_{16}$, the control unit corrects the angle for retardation in accordance with the equation (2) in the step $SP_{35}$ in order to suppress knocking and the flag ADF is reset to zero (ADF=0) in order to select the slow advance angle correction due to the possibility of knocking and the routine then goes to the step $P_{13}$.

In this way, in the third preferred embodiment, the correction of the advance angle is carried out appropriately with the possible occurrence of knocking taken into consideration after the end of the knock induction time interval Tn. The engine performance can be further improved by suppressing abrupt changes in engine torque as compared with the first embodiment described above.

Figure 9:
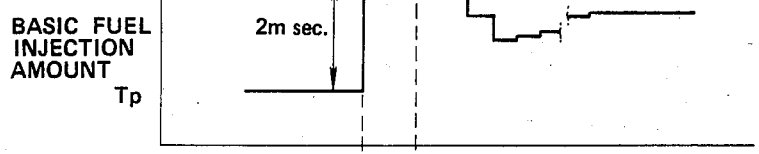
FIGS. 9(a) through 9(c) are timing charts for explaining the action of the third embodiment.
Figure 9:
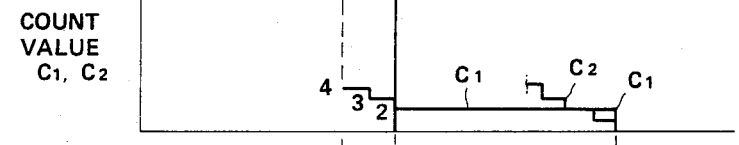
Figure 9:
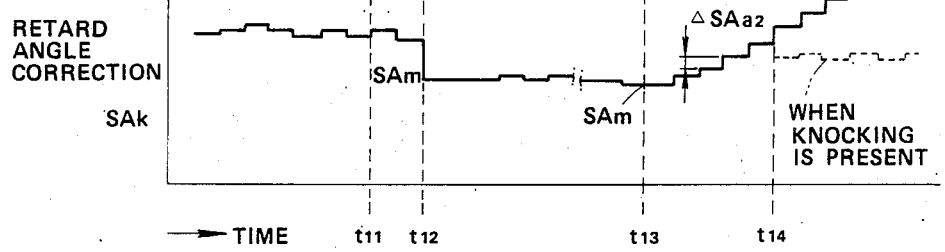

FIGS. 9(a) through 9(c) are timing charts for the ignition timing control mode based on the above-described program flowcharts in FIGS. 8(a) and 8(b). The processing at the beginning of acceleration transfer is the same as in the first preferred embodiment.

At the end of the knock induction time interval Tn at the time $t_{13}$, the current value of SAk is stored as SAm as indicated in FIG. 9(c). Then begins the abrupt advance angle correction at each ignition cycle so that SAk is updated sequentially toward the initial value of SAk (=$0°$) relatively quickly. Hence, after the knock time interval Tn, the ignition timing angle is quickly and incrementally advanced so that a shock due to return of the ignition timing angle to the advance side can appropriately be reduced so that the consequent abrupt change in engine torque can be suppressed. Since the conventional ignition timing control method corrects the advance angle slowly at increments of $\Delta$SAa as shown in FIG. 4(d), the engine torque remains significantly reduced for a relatively long period of time, which contrasts sharply with this embodiment.

In addition, when knocking occurs, e.g., at a timing ot $t_{14}$ during the return of the ignition timing to the advance angle side, the ignition timing can be corrected so as to suppress the recurrence of knocking as indicated in broken lines in FIG. 9(c). In this way, since knocking is suppressed immediately upon detection even during the abrupt advance angle correction reduction of engine performance can be minimized and the ignition timing can be advanced to the greatest possible advance angle so that the output performance of the engine 1 can be guaranteed.

Since the drop in torque can be minimized when and/or after the knock induction time interval due to a lean air-fuel mixture ratio, the engine performance can be improved.

In addition, since the ignition timing is immediately retarded in accordance with the previous learning value when the engine enters a knock induction time interval, knocking can be prevented immediately and engine performance can be improved.

Furthermore, since an appropriate advance angle correction is carried out after the end of the knock induction interval in each embodiment, the reduction of engine output can be minimized and the engine performance can be improved.

It will clearly be appreciated by those skilled in the art that the foregoing description has been made in terms of the preferred embodiments and various changes can be made without departing from the scope of the present invention, which is to be defined by the appended claims.

What is claimed is:

1. A system for controlling the ignition timing of an internal combustion engine, comprising:
    (a) first means for detecting engine operating conditions including engine load;
    (b) second means for determining a basic ignition advance angle on the basis of the detected engine operating conditions;
    (c) third means for producing a transient indication on the basis of the detected engine operating conditions when the rate of change of engine load first increases by a predetermined amount and then decreases by a predetermined amount;
    (d) fourth means for correcting the basic timing advance angle by a retardation angle so that no knocking will occur during the predetermined transient state when said third means produces said transient indication indicating that the engine is starting to operate in the predetermined transient state; and
    (e) fifth means for igniting air-fuel mixture supplied to the engine at a timing corresponding to the corrected ignition timing angle.

2. The system according to claim 1, which further comprises sixth means for recording the value of retardation angle correction when knocking is suppressed during the predetermined transient state and storing the recorded value in conjunction with the current engine operating conditions and wherein said fourth means corrects the basic advance angle by a retardation angle value derived from the value stored in said sixth means in conjunction with the current engine operating conditions.

3. The system according to claim 1, which further comprises: sixth means for returning the corrected ignition advance angle toward the basic advance angle side by adding thereto a predetermined advance angle return value after said third means determines that the predetermined transient state has ended.

4. The system according to claim 3, wherein said predetermined advance angle return value is of the same magnitude as the retardation angle immediately before the end of the predetermined transient state but of the opposite sign.

5. The system according to claim 3, wherein said predetermined advance angle return value is smaller than the retardation angle immediately before the end of the predetermined transient state but of the opposite sign, and said sixth means adds said return value to said corrected ignition angle value in each ignition cycle.

6. The system according to claim 3, which further comprises seventh means for detecting knocking after said third means determines that the predetermined transient state has ended and wherein said sixth means determines the advance angle return value in accordance with the presence or absence of knocking.

7. The system according to claim 6, wherein said advance angle return value first has a negatively large value less than zero and thereafter has a negatively small value.

8. A system for controlling the ignition timing of an internal combustion engine, comprising:
    (a) first means for detecting engine operating conditions;
    (b) second means for determining a basic ignition advance angle on the basis of the detected engine operating conditions;
    (c) third means for determining on the basis of the detected engine operating conditions whether the engine operates in a predetermined transient state having a causal relation to the occurence of knocking wherein said third means determines that the engine is starting to operate in the predetermined transient state when the rate of change of engine load per unit time detected by said first means exceeds a predetermined positive value and thereafter the rate of change drops to a negative value;
    (d) fourth means for correcting the basic timing advance angle by a retardation angle so that no knocking will occur during the predetermined transient state when said third means determines that the engine is starting to operate in the predetermined transient state; and
    (e) fifth means for igniting air-fuel mixture supplied to the engine at a timing corresponding to the corrected ignition timing angle.

9. The system according to claim 8, wherein said first means comprises: sixth means for detecting the number of engine revolutions per unit time; seventh means for detecting an intake air quantity; and eighth means for calculating a basic fuel injection quantity on the basis of the detection results of said sixth and seventh means.

10. A system for controlling the ignition timing of an internal combustion engine, comprising:
    (a) first means for detecting engine operating conditions;
    (b) second means for determining a basic ignition advance angle on the basis of the detected engine operating conditions;
    (c) third means for determining on the basis of the detected engine operating conditions whether the engine operates in a predetermined transient state having a causal relation to the occurrence of knocking wherein said third means determines that the engine is starting to operate in the predetermined transient state when the rate of change of engine load in each ignition cycle detected by said first means first exceeds a predetermined positive value and thereafter the rate of change drops to a negative value;
    (d) fourth means for correcting the basic timing advance angle by a retardation angle so that no knocking will occur during the predetermined transient state when said third means determines that the engine is starting to operate in the predetermined transient state; and (e) fifth means for igniting air-fuel mixture supplied to the engine at a timing corresponding to the corrected ignition timing angle.

11. A method for controlling an ignition timing of an internal combustion engine, comprising the steps of:

(a) detecting engine operating conditions;

(b) determining a basic ignition advance angle on the basis of the detected engine operating conditions;

(c) determining on the basis of the detected engine operating conditions whether the engine is starting to operate in a predetermined transient state having a causal relationship to the occurrence of knocking by determining that the engine is starting to operate in the predetermined transient state when the rate of change of engine load per unit time exceeds a predetermined positive value and thereafter the rate of change drops to a negative value;

(d) correcting the basic ignition timing advance angle by a retardation angle so that no knocking occurs during the predetermined transient state and returning the corrected ignition timing advance angle immediately toward the basic advance angle after the predetermined transient state is over; and (e) igniting air-fuel mixture supplied to the engine at a timing corresponding to the corrected ignition timing angle.

12. The method according to claim 11, further comprising the step (f) of recording the value of retardation angle correction when knocking is suppressed during the predetermined transient state and storing the recorded correction value in conjunction with the current engine operating conditions and wherein the retardation angle is derived from the stored correction value corresponding to the current engine operating conditions.

13. A method for controlling an ignition timing of an internal combustion engine, comprising the steps of:

(a) detecting engine operating conditions;

(b) determining a basic ignition advance angle on the basis of the detected engine operating conditions;

(c) determiming on the basis of the detected engine operating conditions whether the engine is starting to operate in a predetermined transient state having a causal relationship to the occurrence of knocking by determining that the engine is starting to operate in the predetermined transient state when the rate of change of engine load in each ignition cycle first exceeds a predetermined positive value and thereafter the rate of change drops to a negative value;

(d) correcting the basic ignition timing advance angle by a retardation angle so that no knocking occurs during the predetermined transient state and returning the corrected ignition timing advance angle immediately toward the basic advance angle after the predetermined transient state is over; and (e) igniting air-fuel mixture supplied to the engine at a timing corresponding to the corrected ignition timing angle.

* * * * *